United States Patent
Bland et al.

(10) Patent No.: US 11,630,225 B2
(45) Date of Patent: Apr. 18, 2023

(54) SIMULTANEOUS SEISMIC REFRACTION AND TOMOGRAPHY

(71) Applicant: Halliburton Energy Services, Inc., Houston, TX (US)

(72) Inventors: Henry Clifford Bland, Calgary (CA); Glenn Andrew Wilson, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 668 days.

(21) Appl. No.: 16/547,919

(22) Filed: Aug. 22, 2019

(65) Prior Publication Data

US 2020/0284935 A1     Sep. 10, 2020

Related U.S. Application Data

(60) Provisional application No. 62/724,523, filed on Aug. 29, 2018.

(51) Int. Cl.
*G01V 1/52* (2006.01)
*G01V 1/30* (2006.01)
(Continued)

(52) U.S. Cl.
CPC .............. *G01V 1/301* (2013.01); *G01V 1/09* (2013.01); *G01V 1/226* (2013.01); *G01V 1/303* (2013.01); *G01V 1/52* (2013.01)

(58) Field of Classification Search
CPC .......... G01V 1/301; G01V 1/09; G01V 1/226; G01V 1/303; G01V 1/52
See application file for complete search history.

(56) References Cited

U.S. PATENT DOCUMENTS

| | | | | |
|---|---|---|---|---|
| 2,990,904 A | * | 7/1961 | Hawkins | G01V 1/20 367/188 |
| 3,789,951 A | * | 2/1974 | Silverman | G01V 1/09 181/114 |

(Continued)

FOREIGN PATENT DOCUMENTS

| | | | |
|---|---|---|---|
| WO | 9815850 | 4/1998 | |
| WO | 03067201 | 8/2003 | |
| WO | WO-2014165219 A2 * | 10/2014 | ............... G01V 1/22 |

OTHER PUBLICATIONS

Silixa, iDAS™ Data Sheet, 2018.
(Continued)

*Primary Examiner* — Krystine E Breier
(74) *Attorney, Agent, or Firm* — John Wustenberg; C. Tumey Law Group PLLC

(57) ABSTRACT

A data seismic sensing system and method for obtaining seismic refraction data and tomography data. The system may comprise a subsurface sensor array, wherein the subsurface sensor array is a fiber optic cable disposed near a wellbore, a seismic source, wherein the seismic source is a truck-mounted seismic vibrator comprising a base plate, and a surface sensor array, wherein the surface sensor array is coupled to the seismic source. The method may comprise disposing a surface sensor array on a surface, disposing a subsurface sensor array into a wellbore, activating a seismic source, wherein the seismic source is configured to create a seismic wave, recording a reflected seismic wave with the surface sensor array and the subsurface sensor array, and creating a seismic refraction data and a seismic tomography data from the reflected seismic wave.

17 Claims, 2 Drawing Sheets

(51) Int. Cl.
*G01V 1/09* (2006.01)
*G01V 1/22* (2006.01)

(56) References Cited

U.S. PATENT DOCUMENTS

| | | | | |
|---|---|---|---|---|
| 3,923,121 | A * | 12/1975 | Kruppenbach | G01V 1/003 181/112 |
| 5,747,754 | A * | 5/1998 | Svenning | G01V 1/3852 73/644 |
| 8,605,544 | B1 * | 12/2013 | Baig | G01V 1/40 367/57 |
| 2010/0305864 | A1 | 12/2010 | Gies | |
| 2011/0066380 | A1 | 3/2011 | Hager et al. | |
| 2013/0128693 | A1 * | 5/2013 | Geiser | G01V 1/288 367/27 |
| 2013/0265851 | A1 * | 10/2013 | Faber | G01V 1/42 367/25 |
| 2015/0103624 | A1 | 4/2015 | Thompson et al. | |
| 2016/0202374 | A1 * | 7/2016 | Kainkaryam | G01V 1/303 702/6 |
| 2018/0321404 | A1 * | 11/2018 | Klinger | G01V 1/301 |

OTHER PUBLICATIONS

OptaSense, DAS, Borehole Seismic Services, 2016.
Halliburton, Formation Evaluation/Geophysics, FiberVSP Distributed Acoustic Sensing (DAS) Interrogator System, H013014, May 2019.
Pinnacle-Halliburton, Fiber-Optic Sensing Technologies, H09710, 2012.
Fotech Solutions, Helios DAS Distributed Acoustic Sensor, 2008.
Schlumberger, hDVS Distributed Acoustic Sensing System, 2016.
International Search Report and Written Opinion for Application No. PCT/US2019/047654, dated Dec. 4, 2019.

* cited by examiner

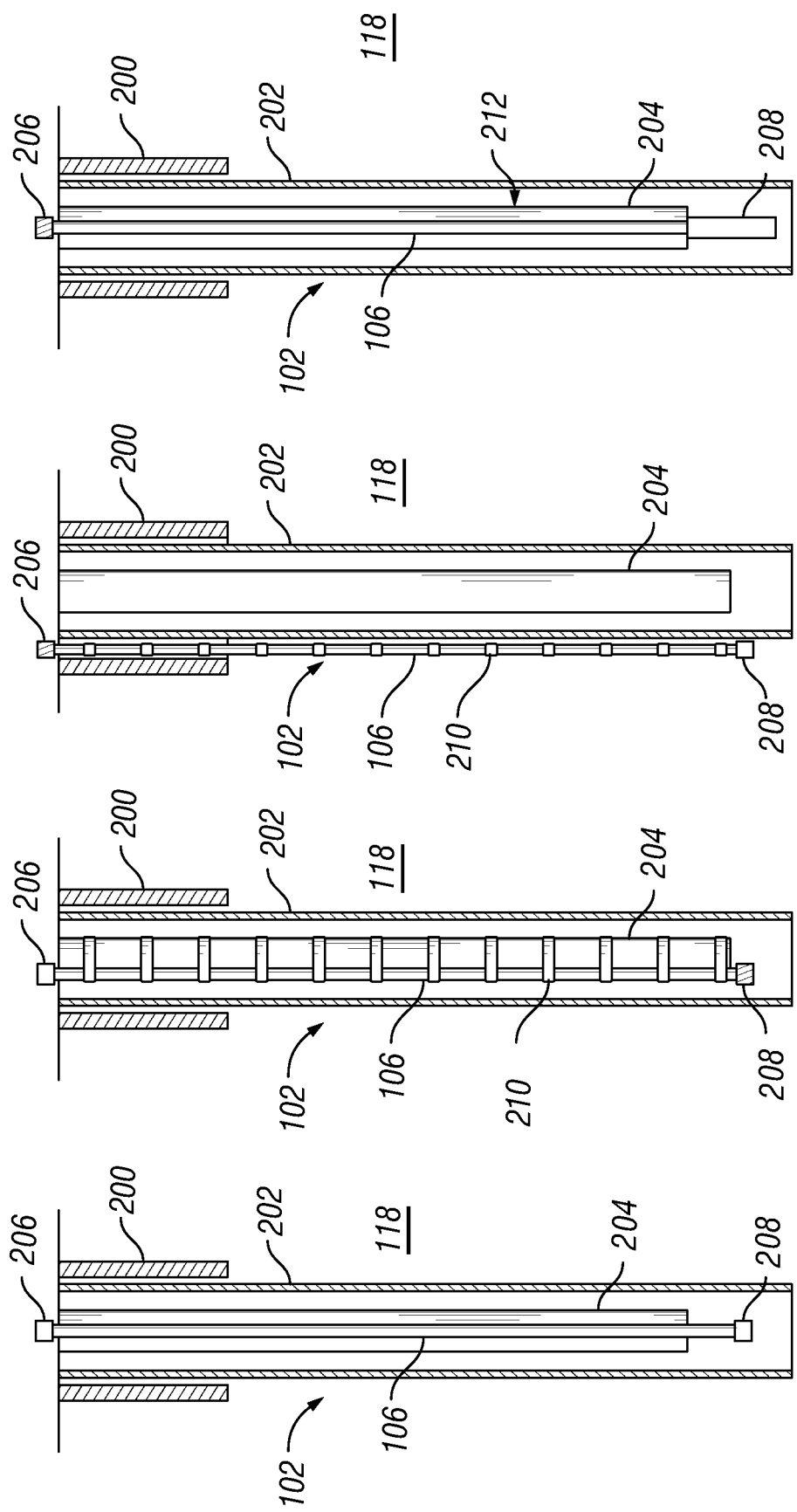

SIMULTANEOUS SEISMIC REFRACTION AND TOMOGRAPHY

BACKGROUND

Boreholes drilled into subterranean formations may enable recovery of desirable fluids (e.g., hydrocarbons) using a number of different techniques. Identifying the formation and formation properties may be beneficial to operators in the recovery of desirable fluids. Currently after the conclusion of drilling operations, a wireline system may perform wireline operations within the borehole and measurements may be taken, covering a specific depth range. During the operation, a vibration source, disposed on the surface, may be activated to cast seismic waves into formations below. A wireline system may detect and allow the recording of the seismic waves as they traverse and/or reflect through the formation.

The processing of the recording signals may be used to produce a profile of seismic velocity for the rock formations traversed by the waves, which may improve the identification of the rock formations or to measure various rock properties. This process of measuring the velocity of seismic waves may be repeated many times to form a vertical seismic profile ("VSP"). However, seasonal variations in surface conditions may lead to variations in the travel time of the seismic waves reflected off of formations. Accurate near-surface velocity determination may be critical for analyzing time-lapse seismic tomography data used in applications such as steam assisted gravity drainage ("SAGD") reservoir monitoring.

BRIEF DESCRIPTION OF THE DRAWINGS

These drawings illustrate certain aspects of some examples of the present disclosure and should not be used to limit or define the disclosure.

FIGS. 2A-2D illustrate different examples of a fiber optic cable deployed downhole in a distributed acoustic sensing system.

DETAILED DESCRIPTION

Figure 1:
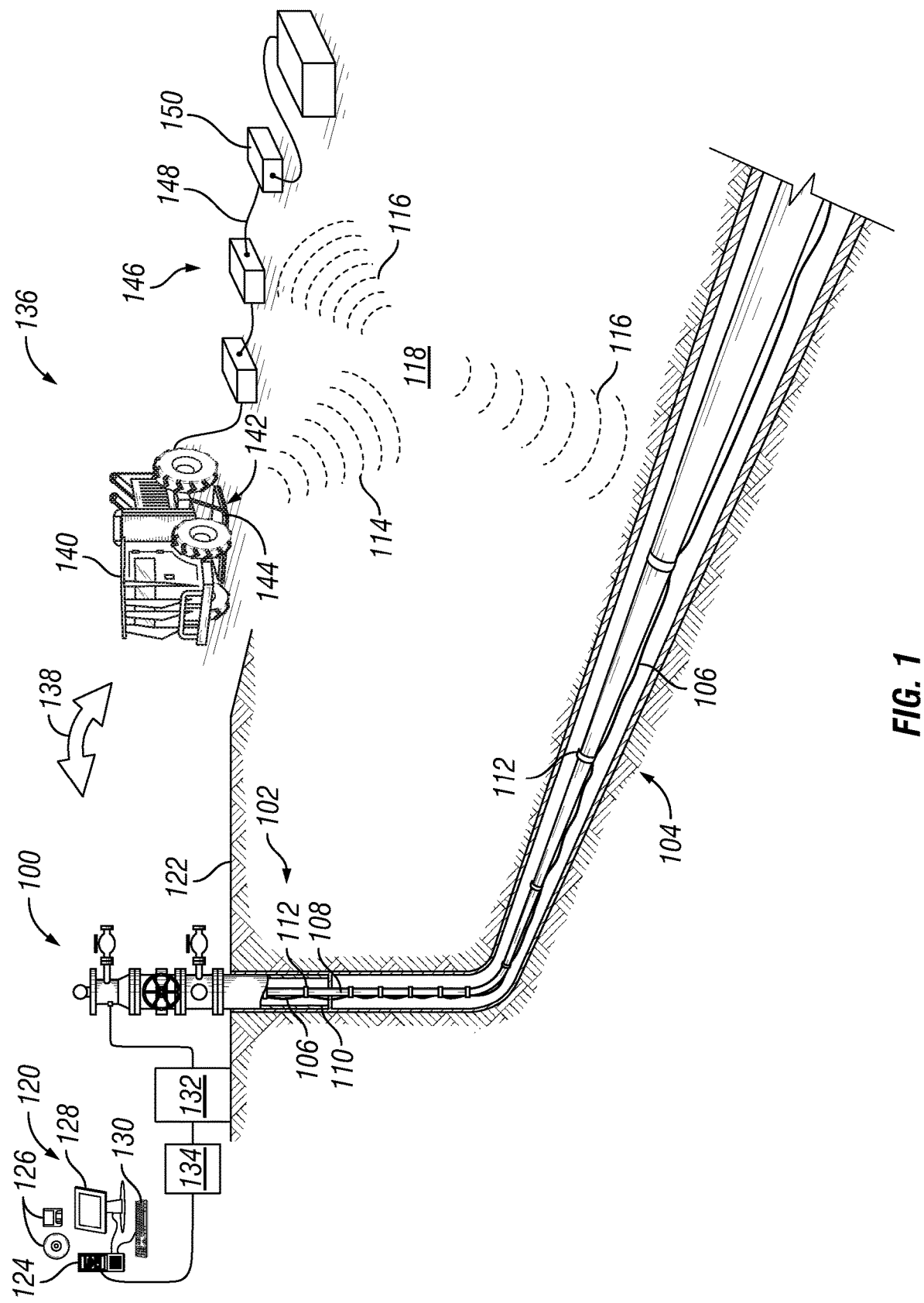
FIG. 1 illustrates an example of a distributed acoustic sensing system operating on a well system.

Provided are systems and methods for characterizing the near-surface and/or reservoir velocity determination of seismic waves for accurate time-lapse seismic tomography analysis for reservoir monitoring. As discussed below, design features may include the utilization of a seismic source disposed on the surface. In examples, the seismic source may produce seismic waves directed into a subterranean formation that are subsequently recorded by a surface sensor array and/or a subsurface sensor array.

FIG. 1 generally illustrates an example of a well system 100 that may be used in a wellbore 102, which may include a distributed acoustic sensing ("DAS") system 104. In examples, wellbore 102 may be a SAGD reservoir, which may be monitored by DAS system 104.

It should be noted that well system 100 may be one example of a wide variety of well systems in which the principles of this disclosure may be utilized. Accordingly, it should be understood that the principles of this disclosure may not be limited to any of the details of the depicted well system 100, or the various components thereof, depicted in the drawings or otherwise described herein. For example, it is not necessary in keeping with the principles of this disclosure for completed well system 100 to include a generally vertical wellbore section and/or a generally horizontal wellbore section. Moreover, it is not necessary for formation fluids to be only produced from formation 118 since, in other examples, fluids may be injected into subterranean formation 118, or fluids may be both injected into and produced from subterranean formation 118, without departing from the scope of the disclosure. Additionally, wellbore 102 may be a producing well, an injection well, a recovery well, and/or an uncompleted well. Further, while FIG. 1 generally depicts land-based system, those skilled in the art will readily recognize that the principles described herein are equally applicable to a subsea operation, without departing from the scope of the disclosure.

In FIG. 1, DAS system 104 may be disposed along production tubing 108 and further within casing 110. DAS system 104 may include a fiber optic cable 106. Fiber optic cable 106 may be single mode, multi-mode, or a plurality thereof. In examples, fiber optic cable 106 may be permanently installed and/or temporarily installed in wellbore 102. Without limitation, DAS system 104 may operate and function to measure and produce a time-lapse vertical seismic profile. Light may be launched into the fiber optic cable 106 from surface 122 with light returned via the same fiber optic cable 106 detected at the surface 122. DAS system 104 may detect acoustic energy along the fiber optic cable 106 from the detected light returned to the surface 122. For example, measurement of backscattered light (e.g., Rayleigh backscattering) can be used to detect the acoustic energy (e.g., seismic waves 114 or reflected seismic waves 116). In additional examples, Bragg Grating or other suitable device can be used with the fiber optic cable 106 for detection of acoustic energy along the fiber optic cable. While FIG. 1 describes DAS system 104 and use of fiber optic cable 106 as the subsurface sensory array for detection of acoustic energy, it should be understood that examples may include other techniques for detection of acoustic energy in wellbore 102. In examples, fiber optic cable 106 may be clamped to production tubing 108. However, fiber optic cable 106 may be clamped to production tubing through connection device 112 by any suitable means. It should be noted that fiber optic cable 106 may also be cemented in place within casing 110 and/or attached to casing 110 by any suitable means. Additionally, fiber optic cable 106 may be attached to coil tubing and/or a conveyance. A conveyance may include any suitable means for providing mechanical conveyance for fiber optic cable 106, including, but not limited to, wireline, slickline, pipe, drill pipe, downhole tractor, or the like. In some embodiments, the conveyance may provide mechanical suspension, as well as electrical connectivity, for fiber optic cable 106. The conveyance may comprise, in some instances, a plurality of electrical conductors extending from surface 122. The conveyance may comprise an inner core of seven electrical conductors covered by an insulating wrap. An inner and outer steel armor sheath may be wrapped in a helix in opposite directions around the conductors. The electrical conductors may be used for communicating power and telemetry to surface 122. Information from fiber optic cable 106 may be gathered and/or processed by information handling system 120, discussed below. For example, signals recorded by fiber optic cable 106 may be stored on memory and then processed by information handling system 120. The processing may be performed real-time during data acquisition or after recovery of fiber optic cable 106. Processing may alternatively occur downhole or may occur both downhole and at surface. In some embodiments, signals recorded by fiber optic cable 106 may be conducted to information handling system 120 by way of the conveyance. Information handling system 120 may process the signals, and the information contained therein may be displayed for an operator to observe and stored for future processing and reference. Without limitation, fiber optic cable 106 may be attached to coil tubing and/or the conveyance by any suitable means. Coil tubing and the conveyance may be disposed within production tubing 108 and/or wellbore 102 by any suitable means.

FIGS. 2A-2D illustrates different examples of deployment of fiber optic cable 106 in wellbore 102. As illustrated in FIG. 2A, wellbore 102 deployed subterranean formation 118 may include surface casing 200 in which production casing 202 may be deployed. Additionally, production tubing 204 may be deployed within production casing 202. In this example, fiber optic cable 106 may be temporarily deployed in a wireline system in which a bottom hole gauge 208 is connected to the distal end of fiber optic cable 106. Further illustrated, fiber optic cable 106 may be coupled to a fiber connection 206. Fiber connection 206 may operate with an optical feedthrough system (itself comprising a series of wet- and dry-mate optical connectors) in the wellhead that may optically couple fiber optic cable 106 from the tubing hanger to the wellhead instrument panel.

FIG. 2B illustrates a permeant deployment of fiber optic cable 106. As illustrated in wellbore 102 deployed in subterranean formation 118 may include surface casing 200 in which production casing 202 may be deployed. Additionally, production tubing 204 may be deployed within production casing 202. In examples, fiber optic cable 106 is attached to the outside of production tubing 204 by one or more cross-coupling protectors 210. Without limitation, cross-coupling protectors 210 may be evenly spaced and may be disposed on every other joint of production tubing 204. Further illustrated, fiber optic cable 106 may be coupled to fiber connection 206 at one end and bottom hole gauge 208 at the opposite end.

FIG. 2C illustrates a permeant deployment of fiber optic cable 106. As illustrated in wellbore 102 deployed in subterranean formation 118 may include surface casing 200 in which production casing 202 may be deployed. Additionally, production tubing 204 may be deployed within production casing 202. In examples, fiber optic cable 106 is attached to the outside of production casing 202 by one or more cross-coupling protectors 210. Without limitation, cross-coupling protectors 210 may be evenly spaced and may be disposed on every other joint of production tubing 204. Further illustrated, fiber optic cable 106 may be coupled to fiber connection 1906 at one end and bottom hole gauge 108 at the opposite end.

FIG. 2D illustrates a coiled tubing operation in which fiber optic cable 106 may be deployed temporarily. As illustrated in FIG. 1D, wellbore 102 deployed in subterranean formation 118 may include surface casing 200 in which production casing 202 may be deployed. Additionally, coiled tubing 212 may be deployed within production casing 202. In this example, fiber optic cable 106 may be temporarily deployed in a coiled tubing system in which a bottom hole gauge 208 is connected to the distal end of downhole fiber. Further illustrated, fiber optic cable 106 may be attached to coiled tubing 212, which may move fiber optic cable 106 through production casing 202. Further illustrated, fiber optic cable 106 may be coupled to fiber connection 206 at one end and bottom hole gauge 208 at the opposite end. During operations, fiber optic cable 106 may be used to take measurements within wellbore 102, which may be transmitted to the surface for further processing.

Referring back to FIG. 1, DAS system 104 may function and operate to measure seismic waves 114 and/or reflected seismic waves 116. Seismic waves 116 may illuminate elements (not illustrated) in formation 118. Seismic waves 114 and/or reflected seismic waves 116 may induce a dynamic strain signal in fiber optic cable 106, which may be recorded by DAS system 104 and/or a surface measuring system 136, discussed below. Alternatively, measurement devices (not shown) may record seismic waves 114 and/or reflected seismic waves 116 and may transmit information to information handling system 120. Measuring dynamic strain in fiber optic cable 106 may include a strain measurement, fiber curvature measurement, fiber temperature measurement, and/or energy of backscattered light measurement. A strain measurement may be performed by an operation of Brillouin scattering (via Brillouin Optical Time-Domain Reflectometry, BOTDR, or Brillouin Optical Time-Domain Analysis, BOTDA), or Rayleigh scattering utilizing Optical Frequency Domain Reflectometry (OFDR). A Fiber curvature measurement may be performed using Polarization Optical Time Domain Reflectometry (P-OTDR) or Polarization-Optical Frequency Domain Reflectometry (P-OFDR). A Fiber temperature measurement may be performed utilizing Raman DTS. An energy of backscattered light of DAS measurement may be performed utilizing an automatic thresholding scheme, the fiber end is set to the DAS channel for which the backscattered light energy flat lines. The purpose of all these measurements may be to compute the structure and properties of formation 118 at different times. This may allow an operator to perform reservoir monitoring.

Information handling system 120 may include any instrumentality or aggregate of instrumentalities operable to compute, estimate, classify, process, transmit, receive, retrieve, originate, switch, store, display, manifest, detect, record, reproduce, handle, or utilize any form of information, intelligence, or data for business, scientific, control, or other purposes. For example, an information handling system 120 may be a personal computer, a network storage device, or any other suitable device and may vary in size, shape, performance, functionality, and price. Information handling system 120 may include random access memory (RAM), one or more processing resources such as a central processing unit 124 (CPU) or hardware or software control logic, ROM, and/or other types of nonvolatile memory. Additional components of the information handling system 120 may include one or more disk drives 126, output devices 128, such as a video display, and one or more network ports for communication with external devices as well as an input device 130 (e.g., keyboard, mouse, etc.). Information handling system 120 may also include one or more buses operable to transmit communications between the various hardware components.

Alternatively, systems and methods of the present disclosure may be implemented, at least in part, with non-transitory computer-readable media. Non-transitory computer-readable media may include any instrumentality or aggregation of instrumentalities that may retain data and/or instructions for a period of time. Non-transitory computer-readable media may include, for example, storage media such as a direct access storage device (e.g., a hard disk drive or floppy disk drive), a sequential access storage device (e.g., a tape disk drive), compact disk, CD-ROM, DVD, RAM, ROM, electrically erasable programmable read-only memory (EEPROM), and/or flash memory; as well as communications media such wires, optical fibers, microwaves, radio waves, and other electromagnetic and/or optical carriers; and/or any combination of the foregoing.

Information handling system 120 may further include a single mode-multimode ("SM-MM") converter 132 and a Fiber VSP interrogator 134. SM-MM converter 132 may be used to convert between a single mode and a multimode for fiber communication. Fiber VSP interrogator 134 may be used to translate light pulses to digital information, which may be read by information handling system 120. In examples, information handling system 120 may communicate with DAS system 104 and act as a data processing system that analyzes measured and/or collected information. This processing may occur at surface 122 in real-time. Alternatively, the processing may occur at surface 122 and/or at another location.

As discussed above, a surface measuring system 136 may also measure and record reflected seismic waves 116 in tandem with DAS system 104. Surface measuring system 136 may provide accurate near-surface velocity determination. Operating and functioning together, surface measuring system 136 and DAS system 104 may both provide measurements that may be processed by information handling system 120 to analyze time-lapse seismic tomography for time-lapse VSP acquisition in reservoir monitoring. Further, information handling system 120 may be used for time-lapse reservoir monitoring. Reservoir monitoring may be performed through a plurality of surveys over a period of time by surface measuring system 136 and DAS system 104. Depending on the point in time in which a survey is conducted, information handling system 120 may be able to correct the travel time and/or velocity model of each seismic wave at depths near surface 122. This may allow for accurate time-lapse seismic tomography analysis.

It should be noted that information handling system 120 may be connected to DAS system 104 and/or surface measuring system 136. Without limitation, information handling system 120 may be a hard connection or a wireless connection 138. Information handling system 120 may record and/or process measurements from DAS system 104 and/or surface measuring system 136 individual and/or at the same time.

Surface measuring system 136 may include a vehicle 140 and surface sensor array 146. As illustrated, vehicle 140 may include a seismic source 142. Seismic source 142 may be used to propagate seismic waves into subterranean formations 118. Without limitations, seismic source 142 may be a compressional source or a shear source. In examples, seismic source 142 may a truck-mounted seismic vibrator. Seismic source 142 may include a baseplate 144 that may be lowered so as to be in contact with the ground. Vibrations of controlled and varying frequency may be imparted to the ground through baseplate 144. When the survey is completed, baseplate 144 may be raised, which may allow seismic source 142 and vehicle 140 to move to another location.

In examples, surface sensor array 146 may be coupled to vehicle 140 and towed behind vehicle 140. In examples, an information handling system (not illustrated) may be disposed on vehicle 140. Surface sensor array 146 may serve to detect and record data provided by reflected seismic waves 116 (i.e. refracted seismic energy or one-way seismic tomography) and/or seismic waves 114 produced by seismic source 142. Without limitations, surface sensor array 146 may include of a communication line 148 and sensors 150. As illustrated, the sensors 150 may be spaced behind the vehicle 140. Without limitation, sensors 150 may be geophones, hydrophones, MEMS accelerometers, and/or combinations thereof. In examples, communication line 148 may include a fiber optic cable. The fiber optic cable may be single-mode, multi-mode, and/or combinations thereof. In other examples, surface sensor array 146 may include a plurality of sensors 150 disposed along communication line 148 of surface sensor array 146. It should be noted that the plurality of sensors 150 may be disposed at a fixed location along sensor array 146 and with a pre-determined spacing. Without limitations, the plurality of sensors 150 may be disposed in series, parallel, and/or combinations thereof within surface sensor array 146. The plurality of sensors 150 may be disposed in individual containers and/or durable enough to travel along surface 122.

During measurement operations, information handling system 120 may take into account reflected seismic waves 116 to produce a VSP. In one example, the seismic refraction data may be processed into a near-surface velocity model. Information handling system 120 may update the near-surface velocity model for seismic tomographic reconstruction (i.e., either travel time or wavelength). Further, information handling system 120 may update the travel time used for travel time tomographic reconstruction of the near-surface velocity model. In examples, the seismic refraction data and the seismic tomography data may be simultaneously inverted in the same near-surface velocity model. This information may be used for reservoir monitoring over any length of time.

The preceding description provides various examples of the systems and methods of use disclosed herein for a data seismic sensing system and method for obtaining seismic refraction data and tomography data, which may contain different method steps and alternative combinations of components.

Statement 1. A data seismic sensing system may comprise a seismic source, wherein the seismic source is configured to create a seismic wave, a subsurface sensor array, wherein the subsurface sensor array is a fiber optic cable disposed near a wellbore and wherein the subsurface sensor array is configured to record a reflected seismic wave, a surface sensor array, wherein the surface sensor array is configured to record the reflected seismic wave, and an information handling system, wherein the information handling system is configured to correct attribute time-lapse seismic data.

Statement 2. The data seismic sensing system of statement 1, wherein the seismic source is a based plate connected to a vehicle.

Statement 3. The data seismic sensing system of statement 2, wherein the surface sensor array is connected to the vehicle.

Statement 4. The data seismic sensing system of statements 1 or 2, wherein the surface sensor array comprises a communication line and a plurality of sensors.

Statement 5. The data seismic sensing system of statements 1, 2, or 4, wherein the subsurface sensor array is connected to a single mode-multimode converter and a fiber vertical seismic profile.

Statement 6. The data seismic sensing system of statement 5, wherein the single mode-multimode converter and the fiber vertical seismic profile are connected to the information handling system.

Statement 7. The data seismic sensing system of statements 1, 2, 4, or 5, wherein the information handling system is further configured to create a near-surface velocity model from the recorded reflected seismic waves by the surface sensor array.

Statement 8. The data seismic sensing system of statements 1, 2, 4, 5, or 7, wherein the information handling system is further configured to create a seismic refraction data and a seismic tomography data from the recorded reflected seismic waves.

Statement 9. The data seismic sensing system of statement 8, wherein the information handling system is further configured to create a velocity model by inverting the seismic tomography data and the recorded reflected seismic waves.

Statement 10. The data seismic sensing system of statements 1, 2, 4, 5, 7, or 8, wherein the information handling system is further configured to update a seismic tomography data with a measured travel time of the reflected seismic wave over a selected time period.

Statement 11. A method for obtaining seismic refraction data and tomography data may comprise disposing a surface sensor array on a surface, disposing a subsurface sensor array into a wellbore, activating a seismic source, wherein the seismic source is configured to create a seismic wave, recording a reflected seismic wave with the surface sensor array and the subsurface sensor array, and creating a seismic refraction data and a seismic tomography data from the reflected seismic wave.

Statement 12. The method of statement 11, further comprising creating the seismic refraction data and the seismic tomography data from the recorded reflected seismic waves.

Statement 13. The method of statements 12, further comprising inverting the seismic tomography data and the recorded reflected seismic waves to create a velocity model.

Statement 14. The method of statements 11 or 12, further comprising updating the seismic tomography data with a measured travel time of the reflected seismic wave over a selected time period.

Statement 15. The method of statements 11, 12, or 14, wherein the surface sensor array comprises a communication line and a plurality of sensors.

Statement 16. The method of statements 11, 12, 14, or 15, wherein the surface sensor array and the seismic source is attached to a vehicle.

Statement 17. The method of statement 16, wherein the seismic source is a base plate connected to the vehicle.

Statement 18. The method of statements 11, 12, 14, 15, or 16, wherein the subsurface sensor array is connected to a single mode-multimode converter and a fiber vertical seismic profile.

Statement 19. The method of statement 18, wherein the single mode-multimode converter and the fiber vertical seismic profile are connected to an information handling system.

Statement 20. The method of statements 11, 12, 14, 15, 16, or 18, further comprising creating a near-surface velocity model from the recorded reflected seismic waves by the surface sensor array.

It should be understood that, although individual examples may be discussed herein, the present disclosure covers all combinations of the disclosed examples, including, without limitation, the different component combinations, method step combinations, and properties of the system. It should be understood that the compositions and methods are described in terms of "comprising," "containing," or "including" various components or steps, the compositions and methods can also "consist essentially of" or "consist of" the various components and steps. Moreover, the indefinite articles "a" or "an," as used in the claims, are defined herein to mean one or more than one of the element that it introduces.

For the sake of brevity, only certain ranges are explicitly disclosed herein. However, ranges from any lower limit may be combined with any upper limit to recite a range not explicitly recited, as well as, ranges from any lower limit may be combined with any other lower limit to recite a range not explicitly recited, in the same way, ranges from any upper limit may be combined with any other upper limit to recite a range not explicitly recited. Additionally, whenever a numerical range with a lower limit and an upper limit is disclosed, any number and any included range falling within the range are specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values even if not explicitly recited. Thus, every point or individual value may serve as its own lower or upper limit combined with any other point or individual value or any other lower or upper limit, to recite a range not explicitly recited.

Therefore, the present examples are well adapted to attain the ends and advantages mentioned as well as those that are inherent therein. The particular examples disclosed above are illustrative only, and may be modified and practiced in different but equivalent manners apparent to those skilled in the art having the benefit of the teachings herein. Although individual examples are discussed, the disclosure covers all combinations of all of the examples. Furthermore, no limitations are intended to the details of construction or design herein shown, other than as described in the claims below. Also, the terms in the claims have their plain, ordinary meaning unless otherwise explicitly and clearly defined by the patentee. It is therefore evident that the particular illustrative examples disclosed above may be altered or modified and all such variations are considered within the scope and spirit of those examples. If there is any conflict in the usages of a word or term in this specification and one or more patent(s) or other documents that may be incorporated herein by reference, the definitions that are consistent with this specification should be adopted.

What is claimed is:

1. A data seismic sensing system, comprising:
    a seismic source, wherein the seismic source is configured to create a seismic wave;
    a subsurface sensor array disposed in a wellbore, wherein the subsurface sensor array comprises a fiber optic cable extending into the wellbore and is connected to a single mode—multimode converter, wherein the subsurface sensor array is configured to record a reflected seismic wave;
    a surface sensor array, wherein the surface sensor array is configured to record the reflected seismic wave, connected to a vehicle and disposed on the surface; and
    an information handling system, wherein the information handling system is configured to correct attribute time-lapse seismic data and create a vertical seismic profile.

2. The data seismic sensing system of claim 1, wherein the seismic source is a based plate connected to the vehicle.

3. The data seismic sensing system of claim 1, wherein the surface sensor array comprises a communication line and a plurality of sensors.

4. The data seismic sensing system of claim 1, wherein the single mode—multimode converter and the fiber vertical seismic profile are connected to the information handling system.

5. The data seismic sensing system of claim 1, wherein the information handling system is further configured to create a near-surface velocity model from the recorded reflected seismic waves by the surface sensor array.

6. The data seismic sensing system of claim 1, wherein the information handling system is further configured to create a seismic refraction data and a seismic tomography data from the recorded reflected seismic waves.

7. The data seismic sensing system of claim 6, wherein the information handling system is further configured to create a velocity model by inverting the seismic tomography data and the recorded reflected seismic waves.

8. The data seismic sensing system of claim 1, wherein the information handling system is further configured to update a seismic tomography data with a measured travel time of the reflected seismic wave over a selected time period.

9. A method for obtaining seismic refraction data and tomography data comprising:
- disposing a surface sensor array on a surface of a wellbore;
- activating a seismic source, wherein the seismic source is configured to create a seismic wave;
- recording a reflected seismic wave with the surface sensor array and a subsurface sensor array that is disposed in the wellbore, wherein the surface sensor array is connected to a vehicle disposed on the surface, wherein the subsurface sensor array comprises a fiberoptic cable that is connected to a single mode—multimode converter, wherein the single mode—multimode converter is connected to an information handling system; and
- creating a seismic refraction data, a vertical seismic profile, and a seismic tomography data from the reflected seismic wave.

10. The method of claim 9, further comprising creating the seismic refraction data and the seismic tomography data from the recorded reflected seismic waves.

11. The method of claim 10, further comprising inverting the seismic tomography data and the recorded reflected seismic waves to create a velocity model.

12. The method of claim 9, further comprising updating the seismic tomography data with a measured travel time of the reflected seismic wave over a selected time period.

13. The method of claim 9, wherein the surface sensor array comprises a communication line and a plurality of sensors.

14. The method of claim 9, wherein the seismic source is a base plate connected to a vehicle.

15. The method of claim 9, further comprising creating a near-surface velocity model from the recorded reflected seismic waves by the surface sensor array.

16. A data seismic sensing system, comprising:
- a seismic source, wherein the seismic source is configured to create a seismic wave; a subsurface sensor array disposed in a wellbore sensor array is configured to record a reflected seismic wave;
- a surface sensor array, wherein the surface sensor array is configured to record the reflected seismic wave and connected to a single mode—multimode converter; and
- an information handling system, wherein the information handling system is configured to correct attribute time-lapse seismic data and create a vertical seismic profile.

17. A method for obtaining seismic refraction data and tomography data comprising:
- disposing a surface sensor array on a surface of a wellbore, wherein the subsurface sensor array comprises a fiberoptic cable that is connected to a single mode—multimode converter, wherein the single mode—multimode converter and the fiber vertical seismic profile are connected to an information handling system;
- activating a seismic source, wherein the seismic source is configured to create a seismic wave;
- recording a reflected seismic wave with the surface sensor array and a subsurface sensor array that is disposed in the wellbore; and
- creating a seismic refraction data, a vertical seismic profile, and a seismic tomography data from the reflected seismic wave.

* * * * *